United States Patent [19]

Horhota

[11] Patent Number: 5,046,523
[45] Date of Patent: Sep. 10, 1991

[54] LOCK CORE SERVICE VALVE

[76] Inventor: George Horhota, 43 A Montgomery Rd., Neshanic Station, N.J. 08853

[21] Appl. No.: 360,289

[22] Filed: Jun. 2, 1989

[51] Int. Cl.$^5$ .................... F16K 35/06; F16K 35/10
[52] U.S. Cl. .................... 137/385; 70/176;
70/179; 137/377; 251/90; 251/95; 251/111;
251/309
[58] Field of Search ............ 70/175, 176, 179, 181,
70/177, 184; 137/385, 377; 251/90, 95, 111,
113, 297, 309

[56] References Cited

U.S. PATENT DOCUMENTS

| 359,714 | 3/1887 | Deming | 70/176 |
|---|---|---|---|
| 703,564 | 7/1902 | Ellison | 137/385 |
| 1,275,135 | 8/1918 | Cunningham | 70/177 |
| 1,325,189 | 12/1919 | Carter | 70/176 |
| 1,923,025 | 8/1933 | Morse | 70/34 |
| 1,970,463 | 8/1934 | Mann | 70/175 |
| 2,092,572 | 9/1937 | Dean | 70/175 |
| 2,761,304 | 9/1956 | Hepler | 70/177 |
| 2,898,081 | 8/1959 | Johnson | 251/309 |
| 3,186,196 | 6/1965 | Moberg | 70/34 |
| 3,554,218 | 1/1971 | Smith | 70/176 |
| 3,560,130 | 2/1971 | Horhota | 251/111 |
| 3,618,906 | 11/1971 | Charron | 137/385 |
| 4,239,710 | 12/1980 | Sato | 137/382 |
| 4,246,929 | 1/1981 | Wakeman | 137/382 |
| 4,377,178 | 3/1983 | Thompson | 137/385 |
| 4,483,366 | 11/1984 | Labita | 137/385 |
| 4,526,194 | 7/1985 | Miller | 137/285 |
| 4,614,203 | 9/1986 | Russo | 137/385 |
| 4,699,168 | 10/1987 | Hauffe et al. | 137/385 |
| 4,709,720 | 12/1987 | Russo | 137/385 |

Primary Examiner—George L. Walton

[57] ABSTRACT

A rotary plug valve is disclosed having a housing and a valve core which can be selectively locked in an unlimited number of positions relative to the mandatory inlet and outlet piping, said valve having no visible indication of the internally concealed locking mechanism location. Selectively, a locking pin, that can be activated by authorized personnel, is passed through a passageway engaging a concealed locking cap preventing rotation of the valve core relative to the valve housing for security and safety applications. Removal of the locking pin with an authorized key permits operation for conventional usages.

17 Claims, 3 Drawing Sheets

LOCK CORE SERVICE VALVE

BACKGROUND OF THE INVENTION

1. Field of Invention

The present invention relates to a rotary plug valve that not only can be opened to fluid flow or closed to fluid flow but can also be selectively and securely locked-closed to fluid flow. In limited application, an adaptation can make this concept lock-open to fluid flow.

2. Description of the Prior Art

Since the inception of piping distribution systems and gas systems in particular, it has been necessary to control the opening and closing of gas supply to each location as required and to securely lock the gas supply for safety and to secure property. Externally exposed locks, shields, shrouds, wings, and locking apertures have been easily sawed, hammered, pried, broken, sheared, levered and otherwise tampered with to circumvent the locking security. Internal locking mechanisms have been complicated, such as spring activated plungers, magnets, single operation mechanisms, and mechanisms requiring special tools that may not be available in emergency situations where fire, police, or emergency may have need to secure an installion.

An unauthorized turn-on of a gas supply can create a fire, explosion or suffocation at some point downstream of the gas valve, particularly in new projects, in renovations, and in unoccupied buildings. In such locations all appliances may not be completely installed. Branch lines may be temporarily not inspected. Unauthorized turn-on of the gas supply can be disasterous.

In cases of non-payment of past due bills, unauthorized turn-on of the gas supply is theft.

U.S. Pat. No. 3,560,130, issued Jan. 15, 1968 to this inventor, created a simple and effective internal locking device, whereby the valve housing enshrouded a locking pin such as a gas-industry-utilized Smith-Morse or E.J. Brooks "Barrel" lock. The vulnerable exposed wings were made internal and an internally concealed locking cap secured a standard locking pin. The locking pin that passed through a cavity through the valve housing, through the valve core and locked into the blind locking cap. To create this internally concealed passageway, additional material was added to two sides of the valve housing, creating two protrusions.

After over twenty years of usage throughout the United States, millions of valves installed, and thousands of valves attacked, some shortcomings to this device became known. Where headroom or sideroom was limited, necessary access for installing the locking pin may have presented some difficulty Access to installing was limited to a single plane at right angles to the inlet and outlet piping. The extra material needed to create the internal locking pin passageway presented some installation difficulty, but, most significantly, these protrusions gave some indication as to where the valve could possibly be attacked. Although there are no reported cases of gas being stolen because of a failed (after thousands of attempts) valve, the many mutilated valves had to be replaced at some cost. Since the valve was designed to fail-safe, hazards were not created. Determining that an unauthorized gas turn-on had been attempted was generally easy, but efforts to determine who was responsible were not as successful.

Some manufacturers of the valves had had problems registering the locking pin through its passageways in the valve core and valve body when the core migrated due to wear on the valve seat. In an attempt to facilitate lining up the holes, those of skill in the art made all the lock pin holes larger, which made the pin more vulnerable to an attack by a puller.

SUMMARY OF THE INVENTION

The object of this invention is to correct the limitations of the PILFER-PROOF valve of U.S. Pat. No. 3,560,130; namely, to improve access for installing the locking pin, improve clearance for installing the valve, eliminate protrusions, and deter attacks on the valve. Rotating the passageway of the valve housing (including the cap segment) and the valve core 90 degrees eliminates all protrusions. The locking pin passageway becomes parallel to the inlet and outlet piping and in close proximity to it. The outside dimensions of the walls of the locking pin passageway are flush with the two sides and the top (head) of the valve housing, creating a formidable rectangle of material enshrouding the locking pin passageway. The mandatory clearance necessary for installing the inlet and outlet piping is also available for installing the valve and the locking pin. The valve can be installed so that the locking pin passageway is in any of an unlimited number of positions around the circumference of the inlet and outlet piping. Alternatively, the valve can be reversed 180 degrees which makes another 360 degrees available to the locking pin and its passageway on the other side of the valve. An installation position can be optimized to achieve access by utility personnel, to achieve concealment, or to impede vandals from gaining access.

The retaining cap may be oriented upstream over the live part of the valve containing live gas; or oriented downstream past the live gas, according to policy. If there is sufficient clearance around the pipes to install the valve, there will be sufficient clearance to access the lock, since both operations require similar clearances.

The two side protrusions of the prior valve are eliminated. The profile of the head is lowered. There are no increases in any of the overall dimensions. As a result, clearance is improved in three directions.

The rectangular design eliminates any indications as to where the locking mechanism may be located or if and how it can be attacked. Placing the entire valve and locking mechanism in this imposing rectangular block is a deterrent. It is apparent to an attacker that making long and elaborate incisions in close proximity to live gas can be hazardous to the attacker.

A color matched dust cap flush to the locking pin entranceway and or a color matched seal, together with an optimum valve positioning installation, could deter an attacker completely.

Fitting clearances for aligning the locking pin and passageway are very tight in the housing section but are loose in the internally concealed passageway through the valve core. This eliptical passageway has its long axis in the same plane as the valve head-torque nut axis. When manufactured, the locking pin passageway of the valve housing is made to register on the bottom (gas port side) of the valve core passageway. This permits adjustment (downward) as the valve core reseats in usage and gives vertical clearance for installing the lock.

In contrast to the conventional approach of making large clearances in all the passages, the clearance of the cylindrical head of the locking pin with the cylindrical entrance of the locking passageway is reduced. This reduction gives extra protection to the head of the locking pin.

The retaining lip of the cap is made perpendicular to the retaining bearings of the locking pin. Thus, bearings are in compression if unauthorized force is placed on the long axis of the locking pin. The locking grooves of the prior art present a more readily circumvented inclined plane if these same unauthorized forces are applied to the prior art locking pin.

BRIEF DESCRIPTION OF THE DRAWINGS

In order that the present invention may be readily carried into effect, it will be described with reference to the accompanying drawings forming a part of the specification, wherein.

DETAILED DESCRIPTION OF THE INVENTION

Figure 1:
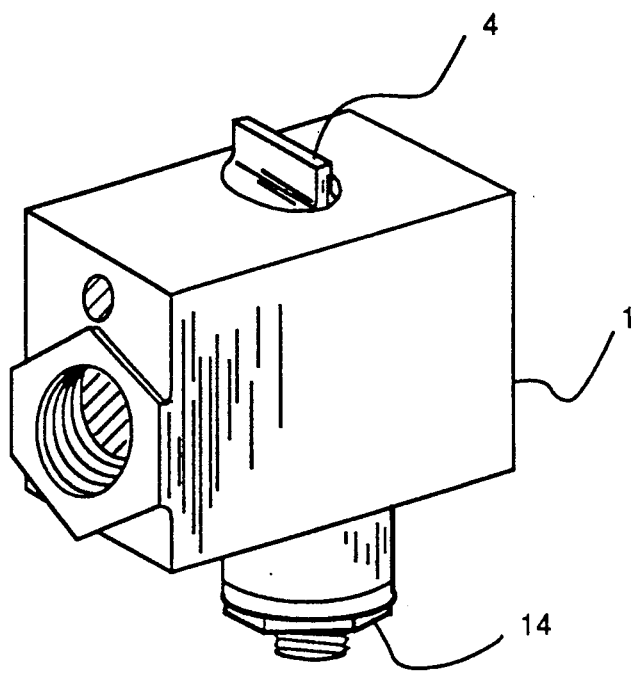
FIG. 1 is a perspective view showing the valve of the present invention with gas ports in the open position.

In the drawings the same components are identified by the same reference numerals.

Figure 2:
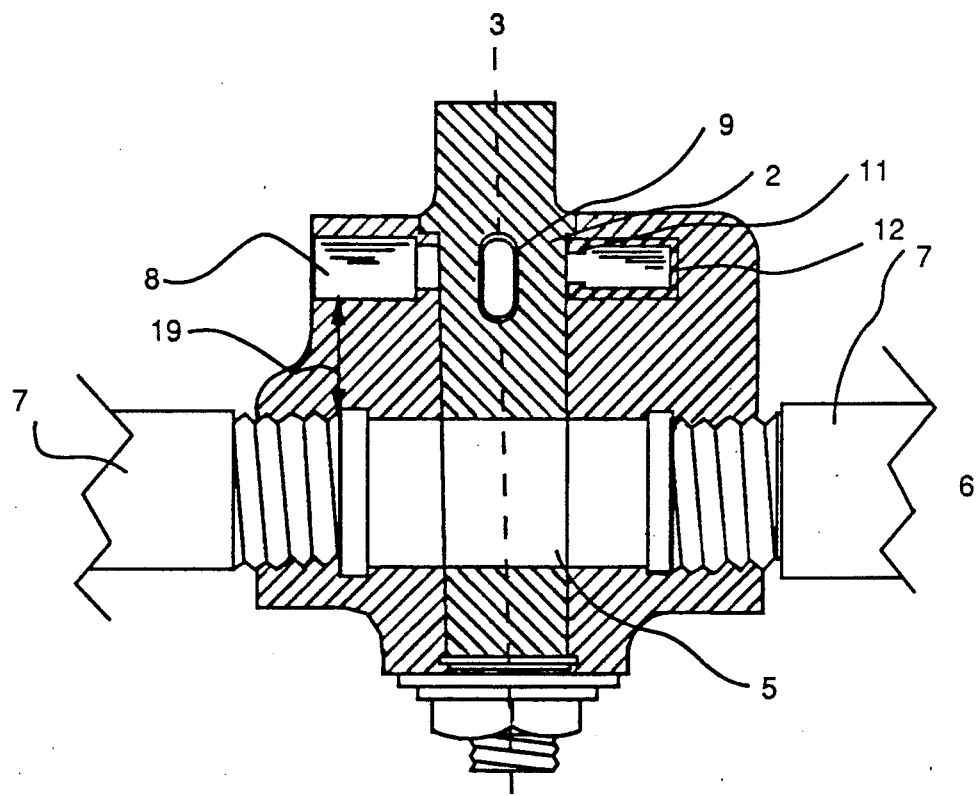
FIG. 2 is a cross sectional view of FIG. 1 through A—A.
Figure 3:
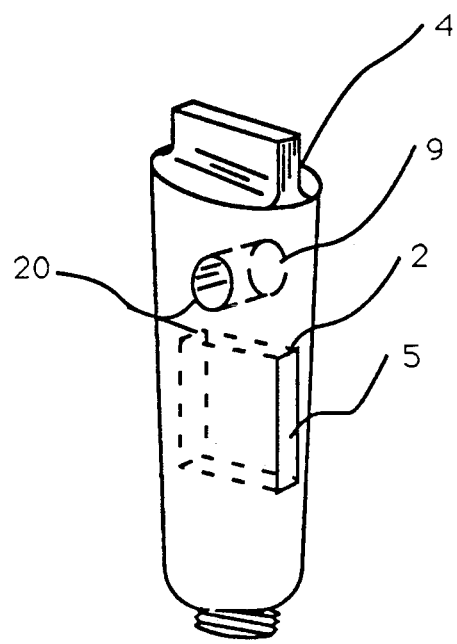
FIG. 3 is a perspective view of the valve core.
Figure 4:
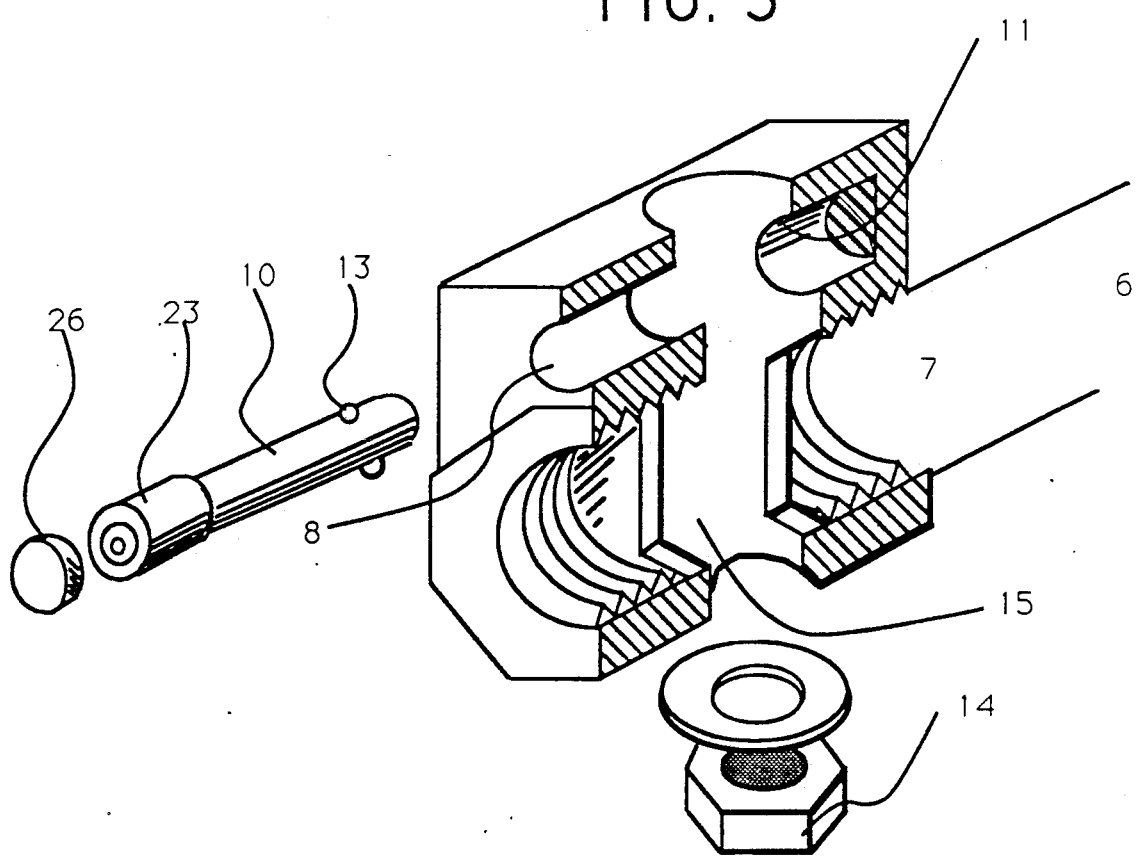
FIG. 4 is a perspective view of the valve housing sectioned through section A—A and all other components (sans dust cap) in perspective view ready for assembly in the locked-closed position when the valve core from FIG. 3 is included.
Figure 5:
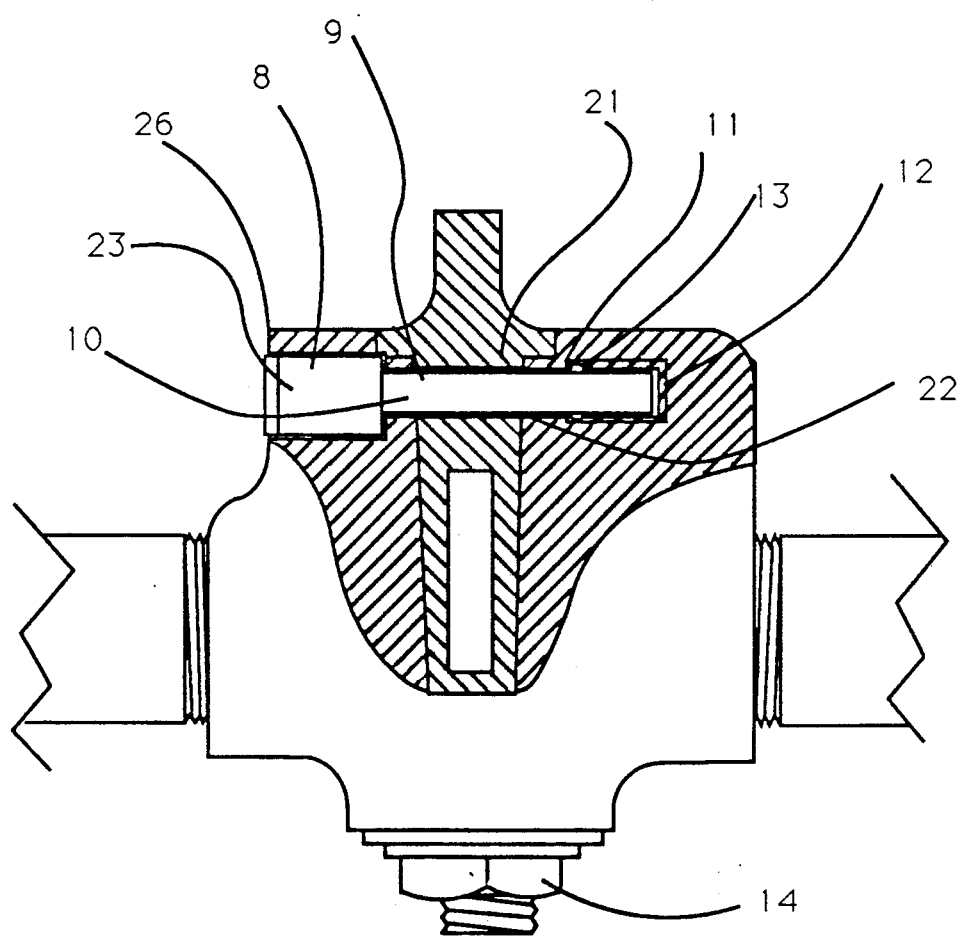
FIG. 5 is a partial section through section A—A showing components in a gas-flow-locked position.

In FIG. 1, valve core 2 (FIG. 2) can be rotated around axis 3 in valve housing 1, the rectangular wrench-operated head 4 of valve core 2 has its longer dimension parallel to the gas ports 5 (FIG. 3) to indicate gas ports open, registering with inlet and outlet piping 7. With valve core 2 thus oriented, locking passageway 9 of valve core 2 (FIG. 2 is not capable of accepting locking pin 10 (FIGS. 4). By rotating valve head 4 (FIG. 3) ninety degrees, whereby gas ports 5 of valve core 2 are perpendicular to inlet and outlet piping 7 (FIG. 5, gas passage is blocked by tapered seating face 15 of valve body 1 (FIGS. 4, 5). Locking pin passageway 8 is aligned and in register with valve core passageway 9 and retaining cap 12 (FIG. 5). For authorized locking off of gas supply a key (not shown) operated locking pin 10 is inserted through locking passageway 8 and 9 and, with the same key, retaining bearings 13 (FIG. 4) are engaged and locked against retaining cap lip 11 (FIG. 4). Said key-operated locking pin can be an industry "Bullet" or "Barrel" lock, as furnished by Smith-Morse or E.J. Brooks, or can be another suitably sized cammed locking cylinder.

The key-activated retaining bearings 13 of locking pin 10 are retracted to clear retaining lip 11 (FIG. 2). Removal of the key causes retaining bearings 13 to move outward, thereby engaging the vertical face of retaining lip 11 (FIG. 5). Retaining bearings are placed in compression if unauthorized tensile or compressive force is placed on either end of locking pin 10. Commercially used caps, for more than fifty years, have used a groove for retaining these bearings. Where such a groove was used, unauthorized tensile or compressive force on either end of the lock had but to overcome an inclined plane. In the present invention, unauthorized effort to rotate valve core 2 for illegal turn-on of gas is thwarted as locking pin 10 is placed in shear in two planes on both ends of locking pin passageway 9. If excessive rotating force is placed on valve core head 4, it is designed in to fail-safe, its head shearing off with the valve in a locked-closed position. Authorized removal of locking pin 10 by utility company personnel after payment of past due account, or after an installation is certified as to safety, permits normal usage of the gas supply system.

Locking pin passageway 8 and retaining cap 12 are parallel and in close proximity to inlet and outlet piping 7. The same access space for installing the necessary supply piping, including a myriad of fittings, is available for installing the valve. The locking pin passageway can be installed in an unlimited number of positions or orientations around the 360 degree circumference of the inlet and outlet piping. The locking pin is always in the same close proximity, positioned at an optium plane for a particular desired access. The same access available for the inlet and outlet piping 7, and the locking passageway 8 is also available for installing locking pin 10. With the elimination of the protrusions that enveloped the locking passageway of U.S. Pat. No. 3,560,130, the outer dimensions of locking pin passageway 8 and 12 (FIG. 2) in valve housing 1 (FIG. 1) are placed within the existing limits of dimension 16 and 17 (flush block), improving installation clearance. Inlet-outlet piping passageway 7 now shares a common wall of material 19 with locking pin passageway 8, eliminating one wall of material and reducing profile 18 (FIG. 1), thereby reducing material.

The locking pin passageway 9 and the gas port 5 of valve core 2 (FIG. 3) are at right angles to each other in this valve-lock-closed configuration. The core is strengthened as there is more material 20 (FIG. 3) in this plane at no increase in material for the complete valve core 2. In the valve-locked-open configuration with parallel ports, the core is weaker. Since the lock-closed configuration is the more vulnerable and more often used configuration (99+ percent), the gain in strength is in the configuration where such gain is most needed.

Eliptical locking passageway 9 of valve core 2 has its long (vertical) axis on center line 3. Adjustment of the tapered seating area of valve core 4 and valve housing seating area 15 with adjusting nut 14 permits continual reseating and gas tightness in the manufacture, fitting, and continual future use and wear. The short axis of elipical locking pin passageway 9 of valve core 2 in manufacturing has greater clearance 21 (FIGS. 2 and 5) on the operating head side of valve core 2 and lesser clearance 22 on the gas port side of valve core 2, permitting future reseating adjustment and creating locking pin installation clearance. Cylindrical locking pin passageway 8 and retaining cap 12 are of minimal clearance to locking pin 10, as locking pin passageway 8 and retaining cap 12 are in fixed and identical planes vertically and horizontally. In other words, they share the same line as a central axis. Locking pin retaining cap 12 and head 23 of locking pin 10 are of a diameter which is larger than the short (horizontal) axis of eliptical passageway 9 of valve core 2, to prevent unauthorized removal of locking pin 10 or locking cap 12.

With the elimination of all locking pin passageway protrusions and the creation of a formidable rectangular block with some of this material at close proximity to the inlet and outlet piping threads, the design gives no indication as to where or how locking is effected or where should be attacked. The color blended dust cap (seal) 26 FIG. 4 and 5 and multiplicity of locking pin orientations are effective deterrents, as is the hazard of working in the proximity of the inlet and outlet piping, where live gas could be encountered, or of making extensive apertures through extended stretches of material.

The valve can be made to lock open for limited control functions by advancing the locking pin passageway 90 degrees in the valve core. It can be made to accept other cylindrical locks with a myriad of keying systems. It can be adapted for water systems, fire hydrants, and other systems where a rotary plug valve needs to be secured.

What is claimed is:

1. Apparatus for securely and selectively locking and unlocking a rotary plug valve in a pipeline, said valve comprising:
   housing means for housing a locking and an armoring apparatus along an axis parallel to the pipeline and for housing a rotary plug valve along an axis substantially perpendicular to an axis of a pipeline in which said valve is provided said housing means having a substantially smooth external contour from end to end along the axis parallel to the pipeline and from end to end across the axis of the pipeline so as to also constitute means for concealing and camouflaging the location of the locking and the armoring apparatus contained therein making the location of the locking and the armoring apparatus difficult to detect;
   valve core means, coaxially rotatably mounted in said housing member for rotation between a first open position for passing fluid in said pipeline and a second closed position for blocking the flow of fluid in said pipeline;
   said valve core means further comprising a locking pin passageway means, oriented parallel to and located in close proximity to the pipeline along said axis parallel to the pipeline when said valve core means is in the closed position for receiving locking pin means;
   retaining cap means for engaging and retaining the inner end of said locking pin means and for preventing said locking pin means from being removed from said locking pin passageway means.

2. Apparatus according to claim 1 wherein the external contour of said housing means is a simple geometric shape, free of any protrusions of the locking pin passageway means.

3. Apparatus according to claim 1 having:
   access space means adjacent a locking head of the locking pin means, for access to said locking pin means; and
   installation space means for installation of the pipeline to the valve;
   said access space means and installation space means being coextensive.

4. Apparatus according to claim 3 having means for rotating the housing 360 degrees about an axis of the pipeline.

5. Apparatus according to claim 4 having means for orienting access to the locking pin means on an inlet side of the pipeline and means for rotating said valve on installation of said valve to orient access to the locking pin means on an outlet side of the pipeline.

6. Apparatus according to claim 5 having a rectangular external contour form means, for depriving pilferers of external indicia of points which would be vulnerable to tampering with a locking mechanism therein.

7. Apparatus according to claim 6 having dust cap means color matched to said housing and mounted
   flush to a surface of the lock form means,
   for covering an entranceway to the locking pin means and
   for camouflaging said entranceway from pilferers.

8. Apparatus according to claim 7 having retaining cap means within the housing, said retaining cap means having a retaining face perpendicular to a longitudinal axis of the locking pin means.

9. Apparatus according to claim 8 having a tapered valve core body comprising a locking pin bore and a gas port, said pin bore and said gas port being oriented at 90 degree angles to each other, said orientation serving as means for providing more mass to said core body than if oriented parallel, for strengthening the valve core, and for constituting said core body as means for blocking the flow of gas in the closed portion with the locking pin passageway means oriented parallel to and in close proximity to the pipeline.

10. Apparatus according to claim 9 in which clearances between the locking pin means and walls of the locking pin passageway means are tight within the housing means, to constitute said pin means and wall means for resisting picking and prying.

11. Apparatus according to claim 10 in which clearances between the locking pin means and the retaining cap are tight, so as to constitute said pin means and said cap as means for resisting pulling and forcing.

12. Apparatus according to claim 11 in which clearances between the locking pin means and walls of the locking pin bore of the valve core are relatively loose, so as to constitute said pin means and said bore as means for adjusting clearances between the valve core and its seat in the housing.

13. Apparatus according to claim 12 wherein said locking pin passageway means is elliptical and said locking pin means is circular.

14. Apparatus for securely and selectively locking and unlocking a rotary plug valve, said apparatus comprising;
   a housing;
   a valve core means, coaxially rotatably mounted in said housing, for rotation, about an axis, between an open position for permitting passage of fluid in a pipeline and a closed position for preventing passage of fluid in the pipeline;
   passageway means for receiving a locking pin, said passageway means comprising:
      an outer passageway from outside the housing into the housing,
      an inner passageway, enclosed within the housing, aligned with the outer passageway,
      a central passageway through the valve core, for alignment with the inner and outer passageways when the valve core is in the closed position;
   said passageway means also serving as means for locking the valve core in he closed position with the locking pin;
   the housing having its axis substantially perpendicular to an axis of the pipeline in which said valve is to be installed;
   said housing having simple geometric shape means, free of any protrusions of the locking pin passageway means, said shape means for concealing and camouflaging the locking pin means making the location of the locking pin means difficult to detect and for armoring said locking pin means against tampering by pilferers;

said passageway means oriented parallel to and in close proximity to the pipeline;

said proximity comprising means for deterring pilferers from attempting to cut into said passageway means;

retaining cap means concealed within the inner passageway;

said retaining cap having a larger outer dimension than the central passage, as securement means for retaining the retaining cap means in the inner passageway;

the outer passageway being similar in cross-section to the locking pin, defining tight clearance means, between the outer passageway and the locking pin, for resisting picking and prying;

the central passageway being elliptical in cross section, having its long elliptical axis in a direction of the housing and core axis, said elliptical cross section defining:

tight clearances to the locking pin in a direction of core rotation, as means for resisting valve core rotation, and loose clearances in the core axial direction, as means for allowing adjustment of the valve core's seating; and the retaining cap having a retaining lip, that perpendicular to retaining bearings on the locking pin, as means for resisting pulling of the pin from said locking pin passageway means.

15. Apparatus for securely and selectively locking and unlocking a rotary plug valve, said apparatus comprising:

a housing;

a valve core means, coaxially rotatably mounted in said housing, for rotation, about an axis, between an open position for permitting passage of fluid in a pipeline and a closed position for preventing passage of fluid in the pipeline;

passageway means for receiving a locking pin, said passageway means comprising:

an outer passageway from outside the housing into the housing, an inner passageway, enclosed within the housing, aligned with the outer passageway, a central passageway through the valve core, for alignment with the inner and outer passageways when the valve core is in he closed position;

said passageway means also serving as means for locking the valve core in the closed position with the locking pin;

the housing having its axis substantially perpendicular to an axis of the pipeline in which said valve is to be installed;

said housing having simple geometric shape means, free of any protrusions of the locking pin passageway means, said shape means for concealing and camouflaging the locking pin means making the location of the locking pin means difficult to detect and for armoring said locking pin means against tampering by pilferers;

said passageway means oriented parallel to and in close proximity to the pipeline;

said proximity comprising means for deterring pilferers from attempting to cut into said passageway means.

16. Apparatus according to claim 15:

the outer passageway being similar in cross-section to the locking pin, defining tight clearance means, between the outer passageway and the locking pin, for resisting picking and prying;

the central passageway being elliptical in cross section, having its long elliptical axis in a direction of the housing and core axis, said elliptical cross section defining:

tight clearances to the locking pin in a direction of core rotation, as means for resisting valve core rotation, and loose clearances in the core axial direction, as means for allowing adjustment of the valve core's seating.

17. Apparatus claim according to claim 16 having;

a retaining cap means concealed within the inner passageway;

said retaining cap having a larger outer dimension than the central passage, as securement means for retaining the retaining cap means in the inner passageway; and the retaining cap having a retaining lip, that is perpendicular to retaining bearings on the locking pin, as means for resisting pulling of the pin.

* * * * *

UNITED STATES PATENT AND TRADEMARK OFFICE
CERTIFICATE OF CORRECTION

PATENT NO. : 5,046,523
DATED : 9/10/91
INVENTOR(S) : George Horhota

It is certified that error appears in the above-identified patent and that said Letters Patent is hereby corrected as shown below:

Column 6, line 60 "he" should be --the--; and

Column 8, line 5 "he" should be --the--.

Signed and Sealed this

Twenty-second Day of December, 1992

Attest:

DOUGLAS B. COMER

*Attesting Officer*          *Acting Commissioner of Patents and Trademarks*